(12) United States Patent
Siebert (10) Patent No.: US 11,176,031 B2
(45) Date of Patent: Nov. 16, 2021

(54) AUTOMATIC MEMORY MANAGEMENT USING A MEMORY MANAGEMENT UNIT

(71) Applicant: aicas GmbH, Karlsruhe (DE)

(72) Inventor: Fridtjof Siebert, Karlsruhe (DE)

(73) Assignee: aicas GmbH, Karlsruhe (DE)

( * ) Notice: Subject to any disclaimer, the term of this patent is extended or adjusted under 35 U.S.C. 154(b) by 95 days.

(21) Appl. No.: 15/855,146

(22) Filed: Dec. 27, 2017

(65) Prior Publication Data

US 2018/0137045 A1 May 17, 2018

Related U.S. Application Data

(63) Continuation of application No. PCT/EP2016/064761, filed on Jun. 24, 2016.

(30) Foreign Application Priority Data

Jun. 29, 2015 (EP) .............................. 20150174377

(51) Int. Cl.
G06F 12/02 (2006.01)
G06F 12/10 (2016.01)
G06F 12/1036 (2016.01)

(52) U.S. Cl.
CPC ...... *G06F 12/0238* (2013.01); *G06F 12/0246* (2013.01); *G06F 12/0253* (2013.01);
(Continued)

(58) Field of Classification Search
None
See application file for complete search history.

(56) References Cited

U.S. PATENT DOCUMENTS

2006/0236059 A1* 10/2006 Fleming .............. G06F 12/0223
711/170
2008/0065841 A1 3/2008 Lee
(Continued)

FOREIGN PATENT DOCUMENTS

JP 2005108216 A 4/2005
JP 2007513437 A 5/2007
(Continued)

OTHER PUBLICATIONS

European Search Report for EP Application No. 15174377.0, dated Jan. 4, 2016, 5 pages.
(Continued)

*Primary Examiner* — Jared I Rutz
*Assistant Examiner* — Marwan Ayash
(74) *Attorney, Agent, or Firm* — Brake Hughes Bellermann LLP (57) ABSTRACT

In a computer system, an automatic memory management module operates by receiving, from a mutator, memory allocation requests for particular objects to be stored in a random-access memory and allocating particular logical addresses within a logical address space to the particular objects. The automatic memory management module distinguishes the particular objects according to at least one criterion and allocates logical addresses from a first sub-space and logical addresses from a second sub-space. A memory management unit maps the allocated logical addresses from the second sub-space to physical memory in the random-access memory. The logical addresses within the first sub-space are compacted in combination with moving corresponding objects in the random-access memory.

20 Claims, 6 Drawing Sheets

(52) U.S. Cl.
CPC .......... *G06F 12/10* (2013.01); *G06F 12/1036* (2013.01); *G06F 2212/7201* (2013.01); *G06F 2212/7205* (2013.01)

(56) References Cited

U.S. PATENT DOCUMENTS

| 2010/0174876 A1 | 7/2010 | Kasahara et al. |
| 2010/0250893 A1 | 9/2010 | Cummins et al. |
| 2012/0102289 A1 | 4/2012 | Maram et al. |

FOREIGN PATENT DOCUMENTS

| JP | 2008217134 A | 9/2008 |
| JP | 2009501384 A | 1/2009 |
| JP | 2018525724 A | 9/2018 |
| WO | 2005066791 A1 | 7/2005 |
| WO | 2007011422 A2 | 1/2007 |

OTHER PUBLICATIONS

International Search Report and Written Opinion for International Application PCT/EP2016/064761, dated Oct. 7, 2016, 9 pages.
English translation Office Action for Japanese Application No. JP2017-568416, dated Dec. 14, 2018, 5 pages.
Decision to Grant for Japanese Application No. 2017-568415, dated Feb. 25, 2019, 3 pages.
Extended European Search Report and Opinion from EP Application No. 15174377.0 dated Jan. 4, 2016, 5 pages.
Response filed in EP Application No. EP15174377.0 dated Jul. 3, 2017, 11 pages.
Notice of Intention to Grant received in European Application No. 15174377.0 dated Apr. 11, 2019, 40 pages.
Lithmee: "What is the Difference Between Physical and Virtual Memory", PEDIAA, retrieved from https://pediaa.com/what-is-the-difference-between-physical-and-virtual-memory/, Nov. 26, 2018, 7 pages.
Ankit Bisht: "Logical and Physical Address in Operating System", GeeksforGeeks, retrieved from https://www.geeksforgeeks.org/logical-and-physical-address-in-operating-system/, Sep. 21, 2016, 4 pages.
Paul Gribble: "7. Memory : Stack vs Heap", retrieved from https://gribblelab.org/CBootCamp/7_Memory_Stack_vs_Heap.html, Summer 2012, 4 pages.

\* cited by examiner

AUTOMATIC MEMORY MANAGEMENT USING A MEMORY MANAGEMENT UNIT

CROSS-REFERENCE TO RELATED APPLICATIONS

This application claims priority to, and is a continuation of, International Application No. PCT/EP2016/064761, filed Jun. 24, 2016, claiming priority to European Patent Application No. EP20150174377, filed Jun. 29, 2015, both of which priority applications are hereby, incorporated by reference herein in their entireties.

TECHNICAL FIELD

The description relates to computers in general, and to computers with automatic memory management (AMM) in particular. The description also relates to a method, to a computer program product, and to a computer system.

BACKGROUND

Computer systems execute applications that have objects, such as data (e.g., texts, images, bitmaps, control signals, data fields, data arrays, tables) and program code (e.g., for routine calls, tasks, threads). The computer system stores the objects in random-access memory (RAM) and uses logical and physical addresses to identify the objects within the memory. The objects usually refer to each other. The reference relations between the objects can be described by a so-called object graph.

As the applications are continuously being executed, they add objects to memory, modify objects in memory, remove objects from memory, and/or change the reference relations between the objects. Storing objects is not static, but rather highly dynamic.

Consequently, memory space is allocated to some objects, and de-allocated from other objects as long as the application is being executed. Over time, allocation/de-allocation leads to a fragmentation of the RAM, and free memory no longer occupies a contiguous range of addresses. Fragmentation prevents the allocation of contiguous memory to large objects. Splitting the objects into portions is not an option for a variety of other reasons. De-fragmentation techniques include so-called compaction steps, also referred to as compaction hereinafter, to move objects inside memory or inside address spaces.

It is common in the art to perform allocation/de-allocation and/or de-fragmentation by automatic memory management (AMM) modules. The AMM modules are executed in parallel to the applications, or intertwined with the applications. The AMM modules operate according to pre-defined rules. AMM is also known in the art as "garbage collection". AMM modules or other programs or tools that provide AMM are also known as "garbage collectors".

As mentioned, the applications change the reference relations between the objects. In terms of AMM, the application mutates the object graph, and therefore the applications are called "mutators".

In a first scenario, the applications (i.e. the mutators) run directly on computers, and the AMM modules are implemented as functions of the operating systems of the computers.

In a second scenario, the applications need a run-time environment (RTE) for execution. The AMM module can be implemented as a function of the RTE. In that case, the AMM module is executed as a process outside the operating systems (of the computers). For example, the RTE can be specialized for a particular programming language, such as JAVA.

However, in both scenarios, the AMM module consumes computer resources, such as processor time and memory. There is a resource conflict that has at least two aspects: While the AMM module is performing allocation, de-allocation, de-fragmentation or the like, the application has to be stopped or paused. In an alternative, the AMM module has to be programmed with more complexity to allow being executed in parallel.

In more detail, moving an object (during the above-mentioned compaction) prevents the application to access the object while the object is being moved. This causes pauses in the continuous execution of the application. Further, the time it takes to move an object inside the RAM depends on the size of the object. This time-to-size dependency is usually a linear relation: moving a large object takes longer than moving a small object. Allowing objects of arbitrary size to be moved may cause the applications to stop for arbitrary time intervals.

Also, again in both scenarios, AMM could cause malfunction of an application for a number of reasons, such as, for example: (i) Fragmentation may prevent the allocation of contiguous memory space to objects. (ii) The AMM module may cause a pause in the execution of the application(s). (iii) The AMM module may fail to identify memory for re-use (reclaim unused memory) quickly enough.

Some applications are used in telecommunications, in controlling industrial machines, or in other areas for which continuous availability of the application in real-time is mandatory. For example, some applications require periodic execution of tasks (periods such as 100 micro seconds).

According to US 2012/102289 A1, objects of different sizes, types or other aspects can be treated differently. For example, small and large objects are distinguished and memory is allocated at opposing ends of heap memory. This approach reduces the work required for compaction. However, this is performed without using a memory management unit (MMU).

According to US 2010/250893 A1, using an MMU avoids copying of physical memory. This approach allows to compact virtual addresses of objects without copying the underlying physical memory. Instead, new virtual addresses of objects are mapped to the original physical addresses. This avoids the need to copy the physical data.

SUMMARY

The present disclosure provides an approach to solve the above-mentioned conflict in a computer system with improved automatic memory management (AMM) module, a computer-implemented method and a computer-program product. In contrast to the mentioned prior art approaches, compacting large objects can be avoided altogether (in virtual as well as in physical memory).

The approach takes advantage of developments in modern computing: computer systems have memory management units (MMU), i.e., hardware that provides a logical-to-physical address mapping, and computer systems have address spaces (e.g., $2^{64}$ addresses) that are larger than the size of the actual physical memory. The space (or "range") for logical addresses is divided into at least two sub-spaces: into a first sub-space for that compaction (during de-fragmentation) is enabled, the so-called "compaction space", and into a second sub-space for that compaction disabled, the so-called "non-compaction space". In other words, the first sub-space is "compactible" and the second sub-space is "non-compactible". The second sub-space is large enough to accommodate all potential objects of all size categories, and the second sub-space is mapped by the MMU to de-allocate physical memory without the need to move objects inside the RAM.

When the application/mutator requests memory for particular objects, the AMM module applies at least one predefined distinction criterion and distinguishes the objects into "compaction objects" and "non-compaction objects", and allocates logical addresses in the compaction space, or in the non-compaction space, respectively.

The distinction criterion is related to the above-mentioned conflict: To address the resource conflict, the objects are distinguished by the object size. There are objects having a size below a threshold size, and objects having a size above (or equal to) the threshold size. In the description, the objects are distinguished as "small objects" and "large objects", respectively.

The AMM module allocates logical addresses in the compaction space to the small objects, and allocates logical addresses in the non-compaction space to the large objects.

The above-mentioned time-size dependency is considered in the sense that compacting a portion of the RAM that stores large objects can be avoided, or can at least be limited to actions by the MMU (i.e., hardware) that do not compete for resources with the AMM module. The threshold size can be the compaction limit that differentiates the allocation of logical addresses into the compaction and non-compaction space.

Optionally, the objects are distinguished according to a combination of criteria.

The AMM module applies compaction to the small objects at logical addresses in the compaction space, but does not need to apply compaction to the large objects (at logical addresses) in the non-compaction space. In view of the resource conflict, it is noted that the time required by the AMM module (in combination with the MMU, and the RAM) for compaction is limited. This time is substantially linearly related to the size of the largest object (having its logical address in the compaction space). The time during that the application would have to be stopped can therefore be limited.

Multiple mutators can access the same object (non-compaction space) at addresses that remain unchanged over time. There is no need to propagate address updates to and between the multiple mutators.

Implementation parameters can take the particulars of the computer system and/or the application into account: In case of object distinction by object size, the compaction space has logical addresses that are spaced according to the threshold size. The threshold size can be related to a page granularity of the RAM.

Alternative embodiments can be implemented. For example, instead of enabling/disabling the compaction, or compaction/non-compaction, the compaction can be performed by different compaction modes, such as compaction at relatively short intervals (first sub-space only) and compaction in relatively large intervals (both sub-spaces).

A computer-implemented method for operating an automatic memory management (AMM) module in a computer system comprises reserving, receiving, allocating, mapping and compacting. A logical address space has first and second sub-spaces.

In the reserving step, the AMM module reserves the second sub-space with portions that have slots of different size classes. The AMM module calculates the size of the second sub-space as the product of a factor and a maximum heap size of the mutator.

In the receiving step, the AMM module receives memory allocation requests from a mutator. The requests are for particular objects to be stored in a random-access memory of the computer system. In the allocating step, the AMM module allocates particular logical addresses within a logical address space to the particular objects. The AMM module thereby distinguishes the particular objects according to at least one criterion and allocates logical addresses from the first sub-space and logical addresses from the second sub-space. In a mapping step, a memory management unit (MMU) maps the allocated logical addresses from the second sub-space to physical memory in the random-access memory. In the compacting step, the MMU compacts logical addresses within the first sub-space while it moves corresponding objects inside the random-access memory.

In allocating, the AMM module optionally distinguishes the particular objects according to the at least one criterion being an object size criterion.

In allocating, the AMM module optionally uses a predefined threshold size as the object size criterion, and allocates logical addresses in the first sub-space for objects having an object size below the predefined threshold size and allocates logical addresses in the second sub-space for objects having an object size above the predefined threshold size or equal to the predefined threshold size.

Optionally, the predefined threshold size can be related to a page size of the random-access memory. The predefined threshold size can be equal to the page size or to a multiple of the page size.

In the step of reserving, the AMM module can reserve the second sub-space of the logical address space, with portions having slots for objects of different size classes. Reserving can be performed for portions of equal size. Reserving can include to calculate the size of a portion in correspondence to the maximum heap size of the mutator, being the accumulated size of the objects potentially to be stored in the second sub-space. Reserving can include to reserve portions. A first portion can have a first number of slots that corresponds to the heap size divided by the predetermined threshold and a second portion can have a second number of slots that corresponds to the first number divided by 2. Alternatively, reserving can include to reserve portions, with a start portion having a first number of slots as a power-of-2 number, and adjacent slots having numbers of slots calculated in a geometric series from the first number of slots.

The method can have the further steps of de-allocating some of the particular logical addresses from either sub-space. The AMM module instructs the MMU to de-map the physical memory from the previously allocated logical addresses in the second sub-space without compacting the objects in random-access memory.

Optionally, the AMM module can distinguish the particular objects according to the at least one criterion being an object attribute. The object attribute can comprise attributes selected from the following: object type, frequency of object accesses, the object being passed to external code, and the object being accessed directly by hardware.

A computer system can perform the steps of the computer-implemented method, and a computer program product that—when loaded into a memory of a computer and being executed by at least one processor of the computer—performs the steps of the computer-implemented method. The computer-program product can be provided such that the AMM module is part of a run-time environment for mutators written in a programming language such as: JAVA, C #, PYTHON, JAVASCRIPT, SCALA, or GO.

DETAILED DESCRIPTION

This description focuses on solving the resource conflict with the distinction criterion being the object size (OS), and illustrates the operation of the AMM module over time by way of example. The description further discusses a flow-chart diagram as well as implementation parameters.

Figure 1:
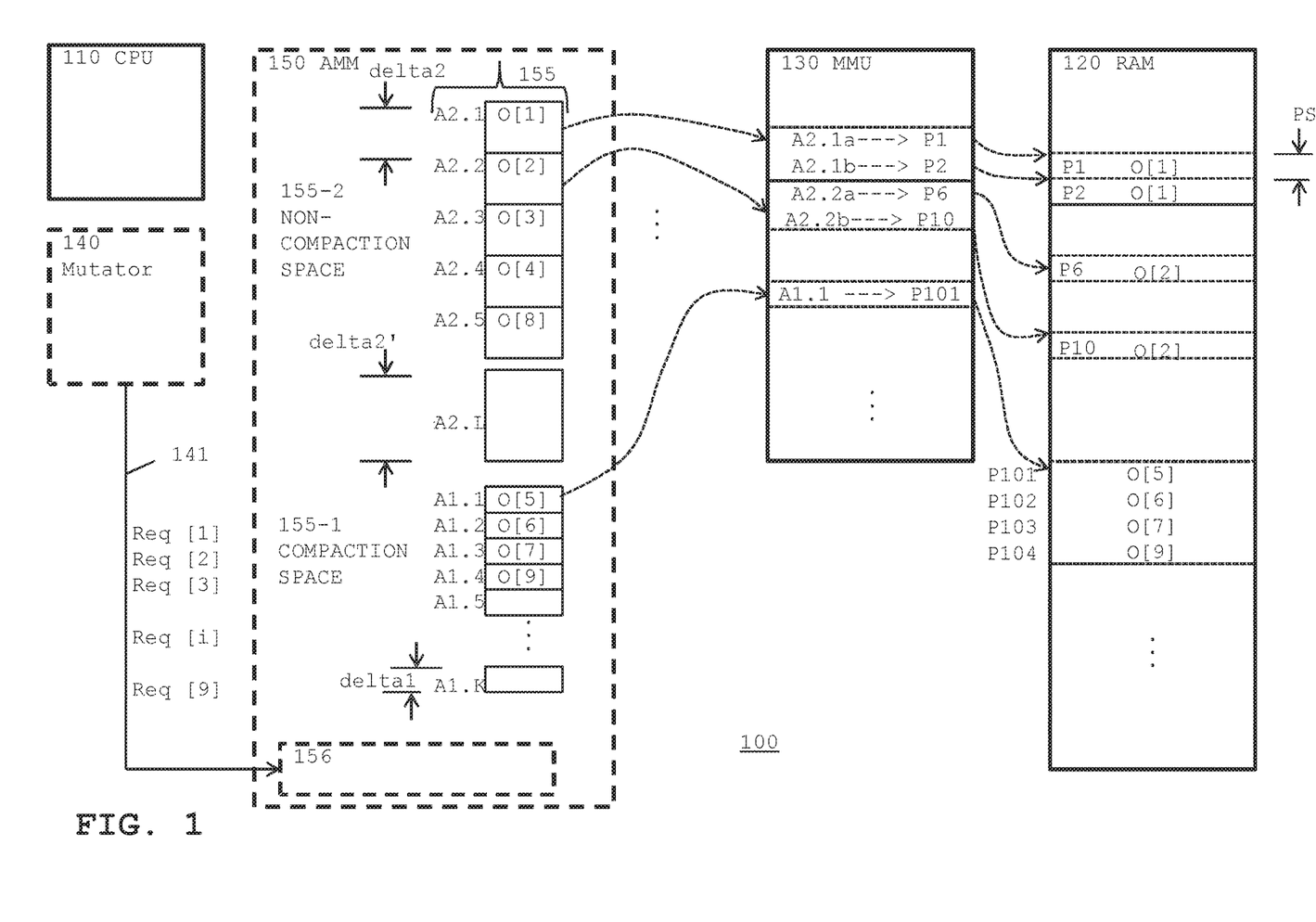
FIG. 1 illustrates a block diagram of a computer system with a processor, a random-access memory, and a memory management unit, as well as a mutator and an automatic memory management (AMM) module.

FIG. 1 illustrates a block diagram of computer system 100 with processor 110 (such as a central processing unit CPU), random-access memory (RAM) 120, and memory management unit (MMU) 130. For simplicity, further hardware components such as busses to communicate data and/or addresses are not illustrated. Computer system 100 is a system that can be used to implement the computer-implemented method (cf. FIG. 4).

FIG. 1 also illustrates software modules (shown as dashed-line rectangles): mutator 140 and AMM module 150. The software modules are implemented in RAM 120 and executed by processor 110, and other implementations are possible. For simplicity, FIG. 1 illustrates the modules outside RAM 120. It is noted that MMU 130, optionally, can be implemented by software.

The software module and the hardware interact with the operating system of the computer system, for example, to actually implement requests.

Mutator 140 is implemented by program code, i.e. code for an application. Mutator 140 can be an application that needs a run-time environment (RTE, sometimes: virtual machine) for execution. For example, mutator 140 can be written in a programming language such as JAVA, C #, PYTHON, JAVASCRIPT, SCALA, or GO. AMM module 150 can be part of that RTE.

For simplicity, it may be assumed that processor 110 can execute only one software module at one point in time. This leads to the requirement to limit the time during which AMM module 150 (and the components that interact with AMM module, such as MMU and RAM) is in operation exclusively (either the AMM module only, not the mutator; or vice versa). This limitation in time is symbolized here as maximal allowed time (or bounded time) $T_{MAX}$, to be usually measured in micro-seconds. The limitation can be relative: $T_{MAX}$ can be a fraction of the time of the mutator (in relation to the execution time of the mutator). The limitation can also be an absolute time interval, to guarantee processor availability for the mutator during pre-defined periods.

Mutator 140, being executed by processor 110, issues memory allocation requests 141 ("Req [i]") for objects to be temporarily stored in RAM 120. The objects can be data objects (e.g., image data, audio data, video data, control data) and/or code objects (e.g., code for program routines), or any other collection of bits and bytes to be stored in RAM 120. In the following, the objects are labelled as O[1], O[2], . . . O[i], . . . according to the order in that mutator 140 issues the requests.

AMM module 150 comprises a logical address space 155 with logical addresses Ax.y. As used herein, the notation "Ax.y" is simplified and can include a start address and an end address, a start address and a range that allows the calculation of the end address, a slot in an address space, or any other convention that identify logical addresses.

In the example, the distance—measured in Bytes—between consecutive addresses Ax.y and Ax.y+1 is the "inter-address space", given as deltax (e.g., delta1, delta2).

Logical address space 155 is assigned to mutator 140. AMM module 150 further comprises function module 156 to perform at least the functions ALLOCATION, DE-ALLOCATION and SELECTIVE COMPACTION. The status of logical address space 155 over time in view of these functions is illustrated by an example in FIG. 2.

In the function ALLOCATION, AMM module 150 receives memory-allocation requests 141 from mutator 140 and allocates logical addresses Ax.y inside logical address space 155 to the objects. Allocating logical addresses Ax.y is selective into at least a first sub-space 155-1 (logical addresses A1.1 . . . A1.K) and a second sub-space 155-2 (logical addresses A2.1 . . . A2.L). The distinction of the sub-spaces is related to the COMPACTION function (at a later point in time) so that first sub-space 155-1 is also referred to as "compaction space" and second sub-space 155-2 is referred to as "non-compaction space". The distinction depends on at least one criterion. As mentioned above, FIG. 1 focuses on the object size criterion.

The size S2 of second sub-space 155-2 is related to the heap size (HS) multiplied with a factor, details for determining size S2 of second sub-space 155-2 are explained in connection with FIG. 4 (reserving) and with FIG. 5.

MMU 130 has a mapping function to map logical addresses Ax.y of address space 155 to physical addresses (P1, P2, . . . ) of RAM 120. MMU 130 manages pages of a fixed size. Usual page sizes can be, for example, 4 KB (Kilobyte) or 128 MB (Megabyte). The example of FIG. 1 assumes a page size of 4 KB. As mentioned above, logical addresses in the non-compaction space can be allocated to large objects (i.e., objects larger than the page size). MMU 130 maps some or more memory pages to contiguous logical addresses. In the example, object O[1] has an object size of 8 KB (or 2 pages), and object O[2] has 8 KB as well. O[1] is an object in the non-compaction space and requires 2 memory pages. As illustrated by dotted arrows, logical addresses A2.1a and A2.1b are allocated to object O[1]; and MMU 130 maps A2.1a to P1 (having a size of one page), and maps A2.1b to P2 (having a size of one page as well). Also, logical addresses A2.2a and A2.2b are allocated to object O[2]; and MMU 130 maps A2.2a to P6 (having a size of one page), and maps A2.2b to P10 (having a size of one page as well). Objects having a different object size (e.g., n pages per object) can be mapped accordingly.

The logical address A1.1 (of the first sub-space) is mapped to the physical address P101. For simplicity, further mappings are not illustrated.

Logical-to-physical mapping (in MMU 130) for logical addresses in sub-space 155-1 (compaction) can be static, it does not need to change to satisfy allocation requests.

FIG. 1 illustrates that objects are stored in memory inside RAM 120 and also illustrates that RAM 120 can be fragmented. For example, physical addresses P1 and P2 are contiguous (without other addresses in-between), and physical addresses P6 and P10 are non-contiguous (separated by P7, P8, P9, not illustrated). MMU 130 can accommodate a fragmentation for large objects, in RAM. But due to the mapping, a single object can have a single logical address, so that the mutator 140 can access such a single object at its single logical address (e.g., O[2] at A2.2). For the performance of mutator 140, it can be an advantage to have logical addresses that are contiguous. In the example, logical addresses A2.1 and A2.2 are contiguous, but the non-contiguity of the objects physically being stored in RAM is accommodated by MMU 130.

Looking to the figure from left to right, mutator 140 issues memory allocation requests 141 (Req [1], Req [2] . . . ) for particular objects O[1], O[2] and so on. AMM module 150 receives requests 141 and allocates a logical address Ax.y to each object. MMU 130 provides the mapping to physical addresses such that the objects are stored in RAM 120.

FIG. 1 illustrates a time point in that logical addresses have been allocated to objects O[1] to O[9], and in that these objects have been stored under the corresponding physical addresses in RAM 120.

Mutator 140 frequently reads, creates, deletes objects, or changes references between different objects O[j] (not illustrated) and O[i]. As the name suggests, mutator 140 continuously mutates the object graph, i.e., mutator 140 changes the references between the objects. As a consequence, some objects may become unreachable from the object graph and therefore become inaccessible by mutator 140, so they no longer need to remain in RAM (so-called "garbage objects"), while the reachable or accessible objects need to remain in RAM (so-called "live objects").

By executing the function DE-ALLOCATION, AMM module 150 periodically de-allocates logical addresses from objects that have been identified as garbage objects by AMM module 150. Since allocating and de-allocating over time lead to fragmentation, by executing the function COMPACTION, AMM module 150 compacts the logical address space by re-assigning (live) objects to other logical addresses Ax.y. To accommodate the above mentioned conflict, AMM module 150 performs the function COMPACTION for the first sub-space only. MMU 130 is therefore used optionally. Instead of compacting, AMM module 150 can fight fragmentation (first sub-space) otherwise, by techniques that are known in the art, for example, by traditional garbage collecting.

MMU 150 can differentiate memory allocation request Req [i] according to the size of the object O[i] (being the criterion). The size of an object (and of address space) can be measured in measurement units such as Byte (B), Kilobyte (KB), Megabyte (MB), Gigabyte (GB) and so on. An object with a size below a threshold size (TS) is allocated to logical addresses A1.y ("compaction space"). During compaction, this small object (if live) would have to be moved inside RAM 120 but the time it takes to move it is below the maximal allowed time $T_{MAX}$. An object with a size above (or equal to) the threshold size (TS) is allocated to logical addresses A2.y ("non-compaction"), so that the large object would not be moved inside RAM 120. In case the object is identified as garbage, AMM module 150 would just free the physical memory by deleting the mapping of logical addresses (of the objects) to physical memory within MMU 130.

Logical addresses A1.y are apart at least by delta1, in the example of FIG. 1, delta 1 corresponds to threshold size TS (delta1=TS). The threshold size TS can be equal to the granularity of a page in RAM 120. For example, TS can be equal to the page size PS=4 KB.

Logical addresses A2.y are apart at least by delta2. For logical addresses A2.y, delta 2 can be implemented for different size classes. FIG. 1 illustrates delta2' for A2.L. Details for such an approach that further differentiates large objects are described in connection with FIG. 5.

Figure 2:
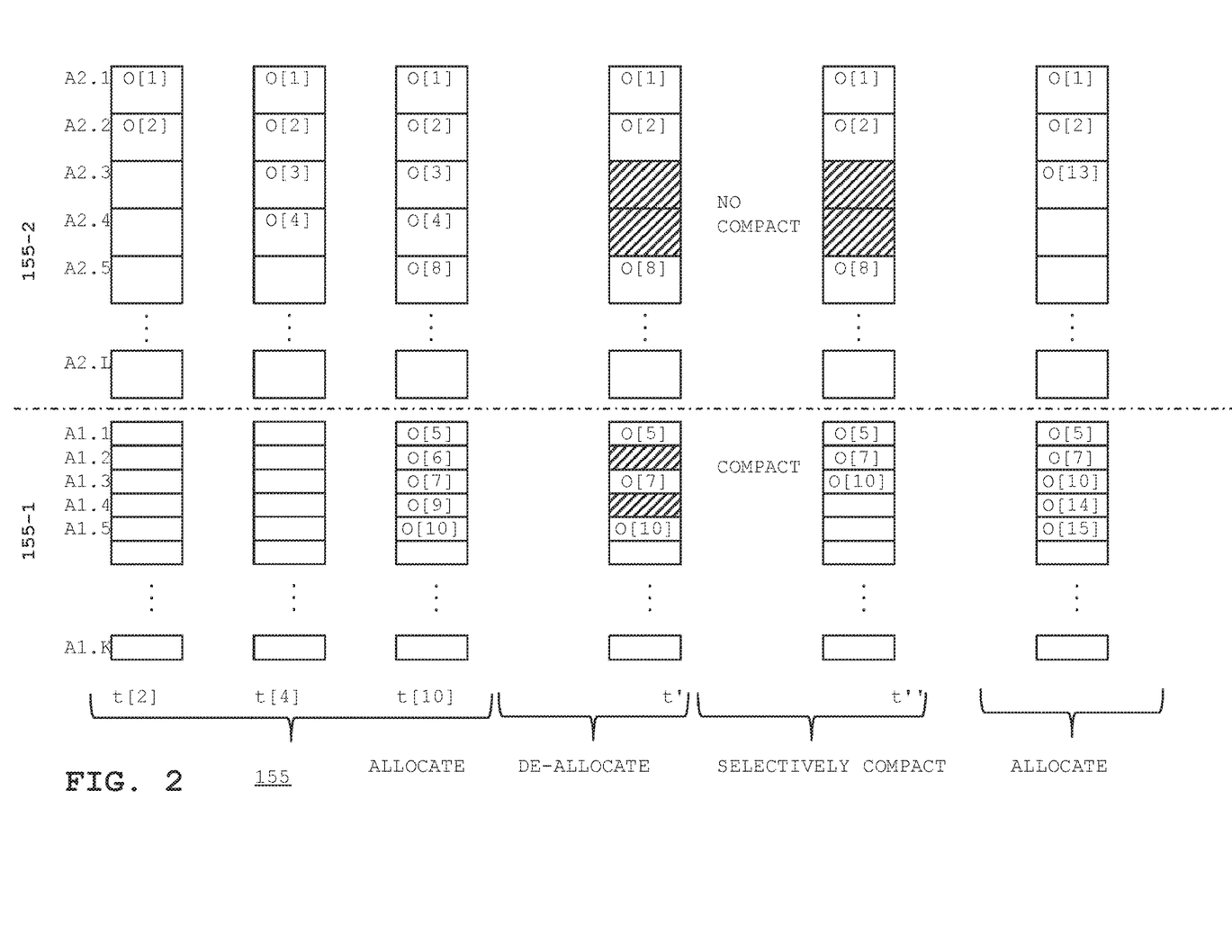
FIG. 2 illustrates a logical address space of the AMM module in the computer system at consecutive points in time.

FIG. 2 illustrates logical address space 155 (sub-spaces 155-1, 152-2) of AMM module 150 in computer system 100 of FIG. 1 at consecutive points in time. It is assumed that AMM module 150 differentiates according to the object size criterion, and distinguishes small objects (<TS) from large objects (>=TS).

At time point t[2], AMM module 150 has received Req [1] and Req [2] and has allocated A2.1 to object O[1] and A2.2 to object O[2]. Both objects have a size above TS, but a size that fits into delta2.

At time point t[4], AMM module 150 has further received Req [3] and Req [4] and has allocated A2.3 to object O[3] and A2.4 to object O[4]. Again, both objects have a size above TS, but fitting into delta2.

At time point t[10], AMM module 150 has further received Req [5] to Req [10], and has allocated logical address A2.5 to O[8] (large object); and A1.1 to O[5], A1.2 to O[6], A1.3 to O[7], A1.4 to O[9] and A1.5 to O[10] (small objects). The addresses are contiguous: A2.1 to A2.5 (i.e., without gap) for O[1], O[2], O[3], O[4], O[8] and A1.1 to A1.4 (i.e., without gap) for O[5], O[6], O[7], O[9], O[10].

At a later point in time t', AMM module 150 has determined objects O[3], O[4], O[6] and O[9] to be garbage objects. As a consequence, AMM module 150 has de-allocated the logical addresses A2.3, A2.4, has instructed MMU 130 to delete the corresponding mapping to physical addresses. AMM module 150 also has de-allocated A1.2, A1.4, but without interaction with MMU 130 or RAM 120). Due to the de-allocation, the address spaces in both sub-spaces 155-1 and 155-2 are no longer contiguous.

At a later point in time t", AMM module 150 has compacted the addresses in the first space 155-1 (only) but has not compacted the addresses in the second space 155-2. Compacting includes interaction with RAM 120 so that objects are moved. However the time it takes to move one of the small objects O[5], O[7] or O[10] is smaller than $T_{MAX}$.

After that short time interruption, mutator 140 continues to be executed and sends out further requests. AMM module 150 can continue to allocate addresses for further objects, such as large objects (e.g., O[13]) and small objects (e.g., O[14], O[15]).

While FIGS. 1-2 focus on the object size as the criterion, AMM 150 can also distinguish particular objects according to an object attribute (OA). The object attribute (OA) can comprise attributes such as (1) object type, (2) frequency of accesses to the object, (3) a distinction between objects being passed to code that is external to the mutator and objects being processed inside the mutator only, and (4) the object being accessed directly by hardware.

Figure 3:
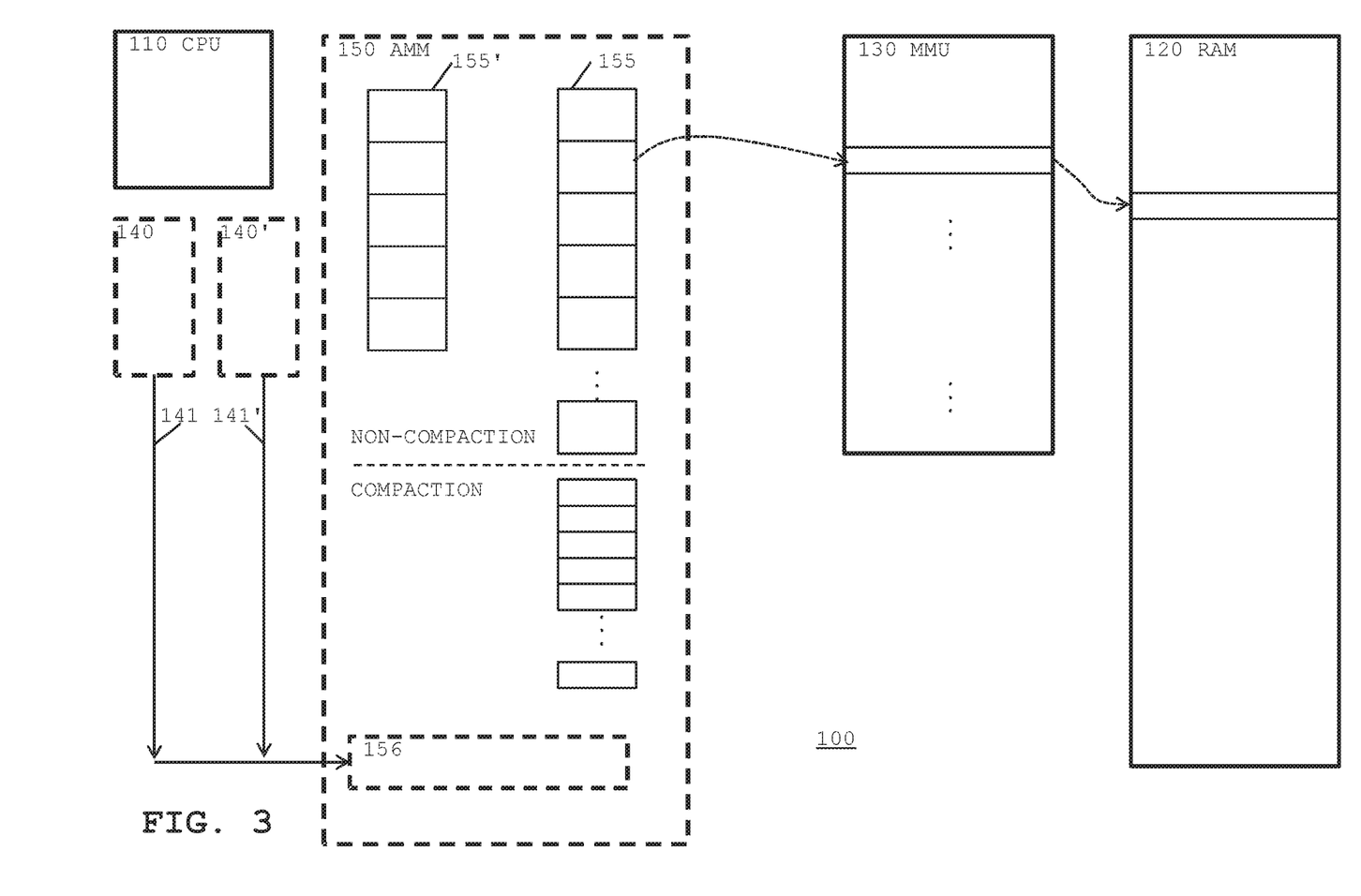
FIG. 3 illustrates the block diagram of the computer system, but with two mutators and an AMM module having two logical address spaces.

FIG. 3 illustrates the block diagram of computer system 100, but with two mutators 140 and 140' and AMM module 150 having two logical address spaces 155 and 155'.

AMM module 150 allocates address spaces 155 and 155' that can have sub-spaces (compact, non-compact). The overall sizes of the address spaces can be different from each other. AMM module 150 receives memory allocation requests 141, 141' (Req) for mutators 140, 140'. Function module 156 can be common for both spaces.

Figure 4:
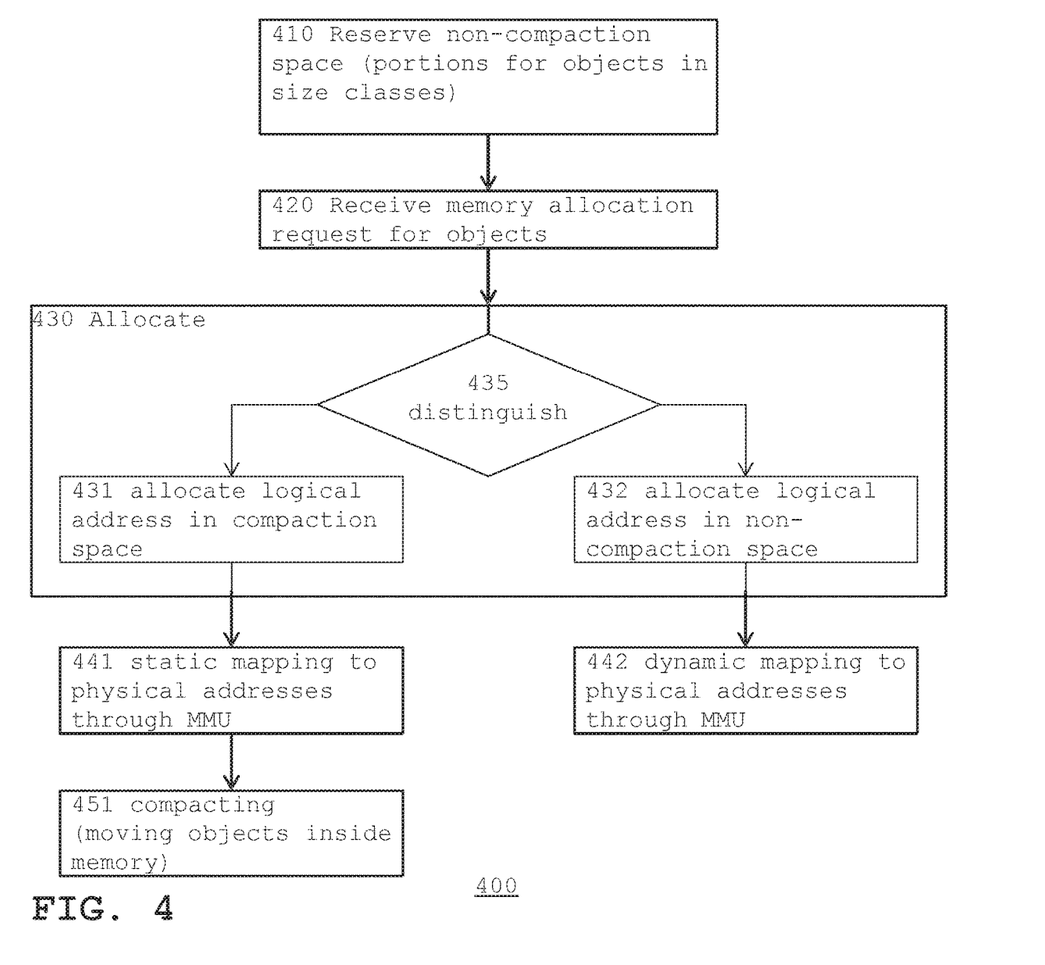
FIG. 4 illustrates a flow-chart diagram of a computer-implemented method.

FIG. 4 illustrates a flow-chart diagram of computer-implemented method 400 for operating AMM module 150 in computer system 100 (cf. FIG. 1).

As explained above, logical address space 155 has first sub-space 155-1 and second sub-space 155-2. In a reserving step 410, AMM module 150 reserves second sub-space 155-2 (of logical address space 155) with portions that have slots for objects of different size classes. Reserving 410 includes to calculate the size (S2) of second sub-space 155-2 as the product of a factor (M) and the maximum heap size (HS) of a mutator (140). As explained, the heap size (HS) is the accumulated size of the objects potentially to be stored in the sub-space 155-2. Further details regarding the sizes will be explained in connection with FIG. 5.

In a receiving step 420, AMM module 150 receives memory allocation requests for particular objects from the mutator. The particular objects are to be stored in the random-access memory of the computer system.

In an allocating step 430, AMM module 150 allocates particular logical addresses within the logical address space to the particular objects. Thereby, AMM module 150 distinguishes 435 the particular objects according to at least one criterion (e.g., threshold TS, object attribute OA), and allocates 431, 432 logical addresses (e.g., A1.y) from a first sub-space (compaction space) and logical addresses (e.g., A2.y) from a second sub-space (non-compaction space).

In a mapping step 442, AMM module 150 instructs memory management unit 130 to map the allocated logical addresses from the second sub-space (i.e., the non-compaction space) to physical memory in the RAM.

In a compacting step 451, the AMM module 150 compacts live objects in logical addresses within the first sub-space (compaction space) in combination with moving corresponding objects in the random-access memory. In contrast, AMM module 150 does not compact live objects in logical addresses within the second sub-space (non-compaction space), but in this case, the MMU re-maps unused physical memory, to logical addresses that are used for newly allocated objects, without moving objects inside RAM.

In allocating step 430, AMM module 150 can distinguish 435 the particular objects according to the at least one criterion being an object size criterion. A predefined threshold size (TS) can be the object size criterion, and AMM module 150 can allocate 431 logical addresses in the first sub-space for objects having an object size below the predefined threshold size (TS) and can allocate 432 logical addresses in the second sub-space for objects having an object size above TS or equal to TS. The predefined threshold size can be related to the page size (PS) of RAM 120, and can be equal to PS.

FIG. 4 also illustrates the operation of MMU 130 that performs mapping 441/442 that means translating logical addresses to physical memory. Both mapping steps are applied once AMM module 150 has allocated a logical address, but with the distinction of mapping 441 using logical addresses from the compaction space and mapping 442 using logical addresses from the non-compaction space. Mapping 441 is considered to be static, without changes over time; but mapping 442 is actually a continuous re-mapping that dynamically maps physical memory to logical addresses currently in use by live objects. In compacting step 451, MMU 130 moves live objects (that have their logical addresses allocated in the compaction space) inside memory. MMU 140 move the objects such that free logical memory (inside the compaction space) becomes available in contiguous ranges that are large enough to use allocations up to the page size (PS).

Figure 5:
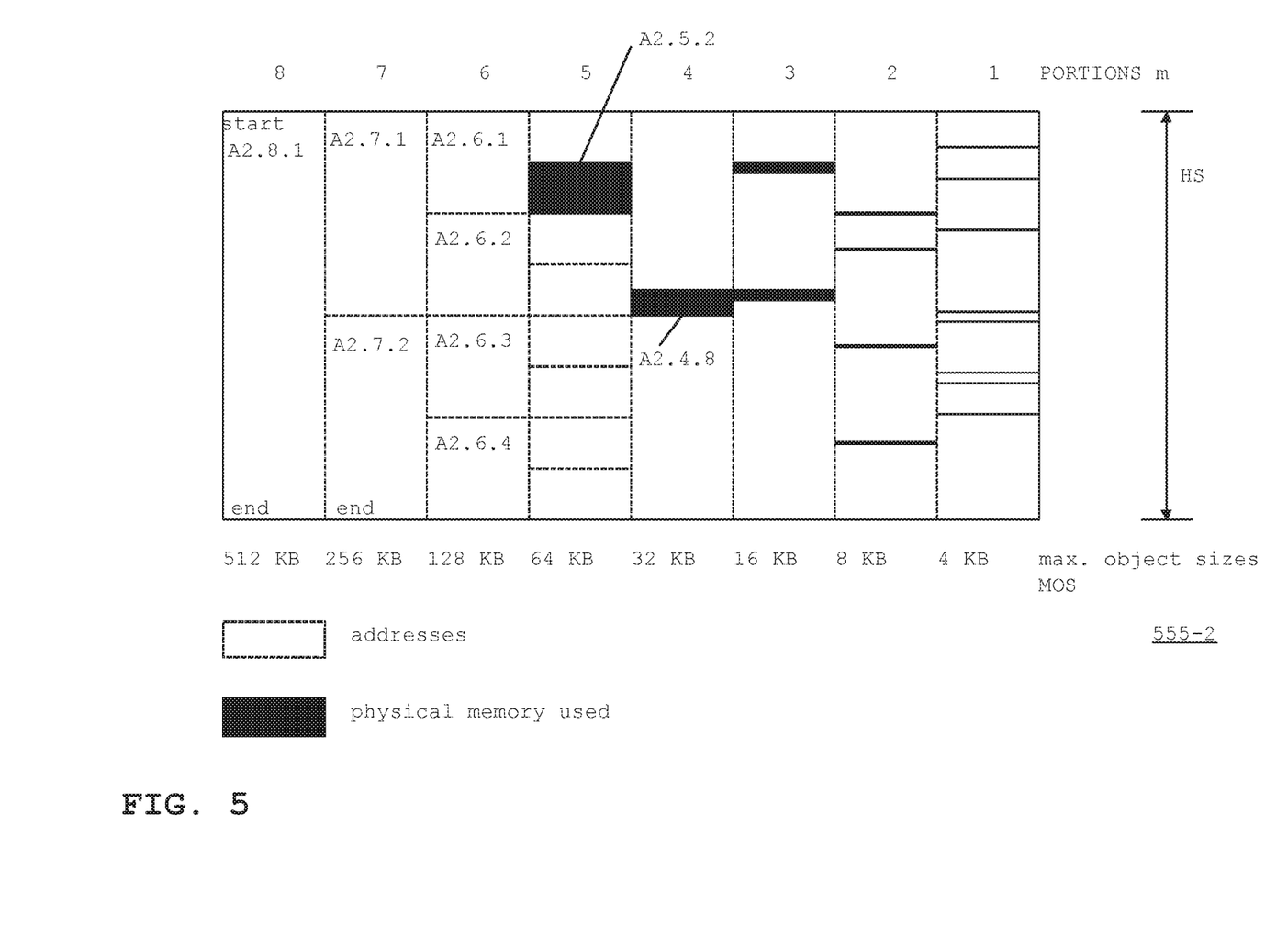
FIG. 5 illustrates a logical address sub-space that is divided into multiple portions.

Again turning to the operation of AMM module 150, in a further step reserving 410, the AMM module 150 reserves the second sub-space of the logical address space with portions having slots for objects of different size classes (cf. FIG. 5). Reserving 410 can be performed for portions of equal size.

Reserving 410 can include to calculate the size of a portion in correspondence to a maximum heap size of the mutator, being the accumulated size of the objects potentially to be stored in the second sub-space. Reserving 410 can include to reserve portions, wherein a first portion has a first number of slots that corresponds to the heap size (HS) divided by the predetermined threshold (TS), and a second portion has a second number of slots that corresponds to the first number divided by 2. In an alternative, a start portion has first number of slots that is a power-of-2 number, and adjacent slots have numbers calculated in a geometric series from the first number.

Method 400 can have further steps of de-allocating some of the particular logical addresses from either sub-space. AMM module 150 instructs the MMU to de-map the physical memory from the previously allocated logical addresses in the second sub-space without compacting the objects in RAM.

Optionally, AMM module 150 can distinguish 435 the particular objects according to the at least one criterion being an object attribute (OA), with attributes such as execution priority, execution frequency, file type, the use of the object to pass data to external code (written in another language or accessed by hardware).

FIG. 4 also illustrates a computer program or a computer program product. The computer program product, which when loaded into a memory of a computer and executed by at least one processor of the computer, performs the steps of computer-implemented method 400. In embodiments, the memory can be RAM 120 and the processor can be CPU 110.

Attention is now directed to implementation aspects that focus on the object sizes that are considered in the reserving 410 step.

As described above, FIG. 1 illustrates that objects in RAM 150 are not fragmented. However, it is possible to keep large objects fragmented, and, as outlined above, perform compacting for the small objects only.

FIG. 5 illustrates a logical address sub-space 555-2 that is divided into multiple portions. Logical address space 555-2 corresponds to logical address space 155-2 of FIG. 1, i.e., to the non-compaction space. In the example, the portions have equal size (measured in Bytes), but this convention is only used for explanation.

The following notation is used: A2.$m.y$ stands for a particular logical address in a particular portion m, with y being an identifier inside each portion (cf. FIG. 1). As mentioned above, logical addresses A2.$m.y$ can include start addresses and end addresses. In FIG. 5, this is illustrated for portions 7 and 8. For example, the end address of A2.7.2 has an offset of one byte below the start address of A2.8.1. Although illustrated in columns, the portions are considered to form a contiguous address space.

The portions have slots in different size classes, measured by the maximum size of an object that can be addressed (max. object size MOS).

Portion 8 has a logical address A2.8.1 for a single object having a maximum object size (MOS) of 512 KB. Portion 7 has 2 logical addresses A2.7.1 and A2.7.2 for 2 objects, each having an MOS=256 KB. Portion 6 has 4 logical addresses A2.6.1 to A2.6.4 for 4 objects, each having an MOS=128 KB. Portion 5 has 8 logical addresses for MOS=64 KB; portion 4 has 16 logical addresses for MOS 32 KB, and so on until portion 1 having 128 logical addresses for MOS=4 KB. Using a power-of-2 scheme is convenient, but optional.

The overall memory requirement of the mutator can be available as a maximum heap size (HS) being the overall size of all large objects (i.e. OS>=TS) that at any given point in time during execution, mutator 140 continues to access. The memory requirement for the small objects (i.e. OS<TS) can be taken into account separately.

Since the size of each portion 1 to 8 corresponds to the maximum heap size, the allocation of addresses will not fail as long as mutator 140 stays within the maximum heap size (i.e., does to issue requests for allocation of objects with summed-up sizes of live objects that exceed the heap size). In extreme cases, mutator 140 can issue a single memory allocation requests for a single object only (e.g., 512 KB), or can issue requests for 128 objects having an object size 4 KB. Usually, mutator 140 issues requests for objects having different sizes.

The overall requirement for the (second) logical address space 555-2 can be calculated, for example, as the number M of portions multiplied by the size of the portion (e.g., equal size), in the example as 8*512 KB. Compared to the address space of the computer (e.g., $2^{64}$ as mentioned above), this overall requirement is usually much smaller.

In an embodiment, each portion can have a size that corresponds to the heap size (HS, e.g., 512 KB). The number M of portions is a factor so that the overall size S2 of the (second) logical address space 555-2 is calculated as the product of the factor and the heapsize, that is $$S2=M*HS.$$

In the example, RAM 120 may have a page enabled addressing scheme with (for example), the page size (PS) corresponding to the MOS of portion 1, that is 4 KB.

AMM module 150 allocates sub-space 555-2 with portions 1 to 8 upon starting up. For example, if AMM module 150 is part of an RTE (e.g., Java Virtual Machine), sub-space 555-2 is allocated upon starting up the RTE. It is also possible to allocate sub-space 555-2 for each new mutator 140 (cf. FIG. 1, 140' in FIG. 2) that is being launched. Upon starting up, AMM module 150 usually has not yet received memory allocation requests (Req) from mutator 140, and MMU 130 has not yet mapped logical addresses A2.*m.y* to RAM 120.

The following description relates to memory allocation requests (Req. FIG. 1) for large objects to be stored in the second sub-space 155-2 (e.g., 555-2) only and assumes that the AMM module 150 uses the object size criterion, with the threshold 4 KB that corresponds to a page size PS=4 KB of RAM 120.

As described above in details in view of FIG. 1, upon receiving a memory allocation request (Req) for a particular object, AMM module 150 determines whether first sub-space 155-1 (compaction space) or second sub-space 155-2 (non-compaction space) is to be used.

AMM module 150 allocates particular logical addresses within the portions 1 to 8 of sub-space 555-2 to the particular large objects according to the size of the objects. For example, AMM module 150 allocates A2.1.*y* in portion 1 to objects with the size 4 KB, allocates A2.1.*y* in portion 2 to objects with the size 8 KB (or smaller) and so on.

AMM module 150 then instructs MMU 130 to provide a mapping of the allocated logical addresses A2.*m.y* to physical memory in RAM 120.

While mutator 140 is being executed, AMM module 150 will de-allocate some logical addresses and re-allocate some logical addresses (cf FIG. 2). As a consequence, the portions 1 to 8 in sub-space 555-2 become fragmented. The example of FIG. 5 illustrates a "snap-shop" in that the logical addresses illustrated with black filling are allocated to physical memory P in RAM 120 (through MMU 130). For example, logical address A2.5.2 (in portion 5) is mapped to 16 pages (with 4 KB each) of physical memory in RAM 120 for a particular object with 64 KB size; logical address A2.4.8 (in portion 4) is mapped to RAM for a particular object with 32 KB size; there are logical addresses in portions 3, 2 and 1 with objects in RAM.

There is no need to have a one-to-one mapping of logical addresses to physical memory. In the example of FIG. 5, the larger part of the logical addresses are not mapped to physical memory.

It is noted that the physical memory used for a single object can be contiguous or non-contiguous. For example, logical address A2.2.12 (in portion 2) with an 8 KB object would require only 2 pages (each 4 KB) physical memory, and MMU 130 can map to contiguous addresses (cf the example of P1 and P2 for O[1] in FIG. 1). If needed, MMU 130 can map to non-contiguous addresses in RAM, for example, by grouping single physical pages for larger allocations (e.g., 4 pages for the object at A2.4.8). The non-contiguousity remains hidden to the mutator.

The maximum object sizes (MOS) in FIG. 5 are illustrated by example only. The power-of-2 scheme can be supplemented by intermediate MOS, such as 6 KB (between 4 KB and 8 KB), 12 KB (between 8 KB and 16 KB), 24 KB and so on until 128 GB.

Using other page sizes (PS) is possible, for example up to a page size of 1 GB.

It is also possible to start with a modified size S2'<S2. In other words, the factor would be smaller. Such an approach would be a compromise between the theoretical size S2=M*HS and a more practical size with the assumption that not all theoretical possible object sizes would be used.

Figure 6:
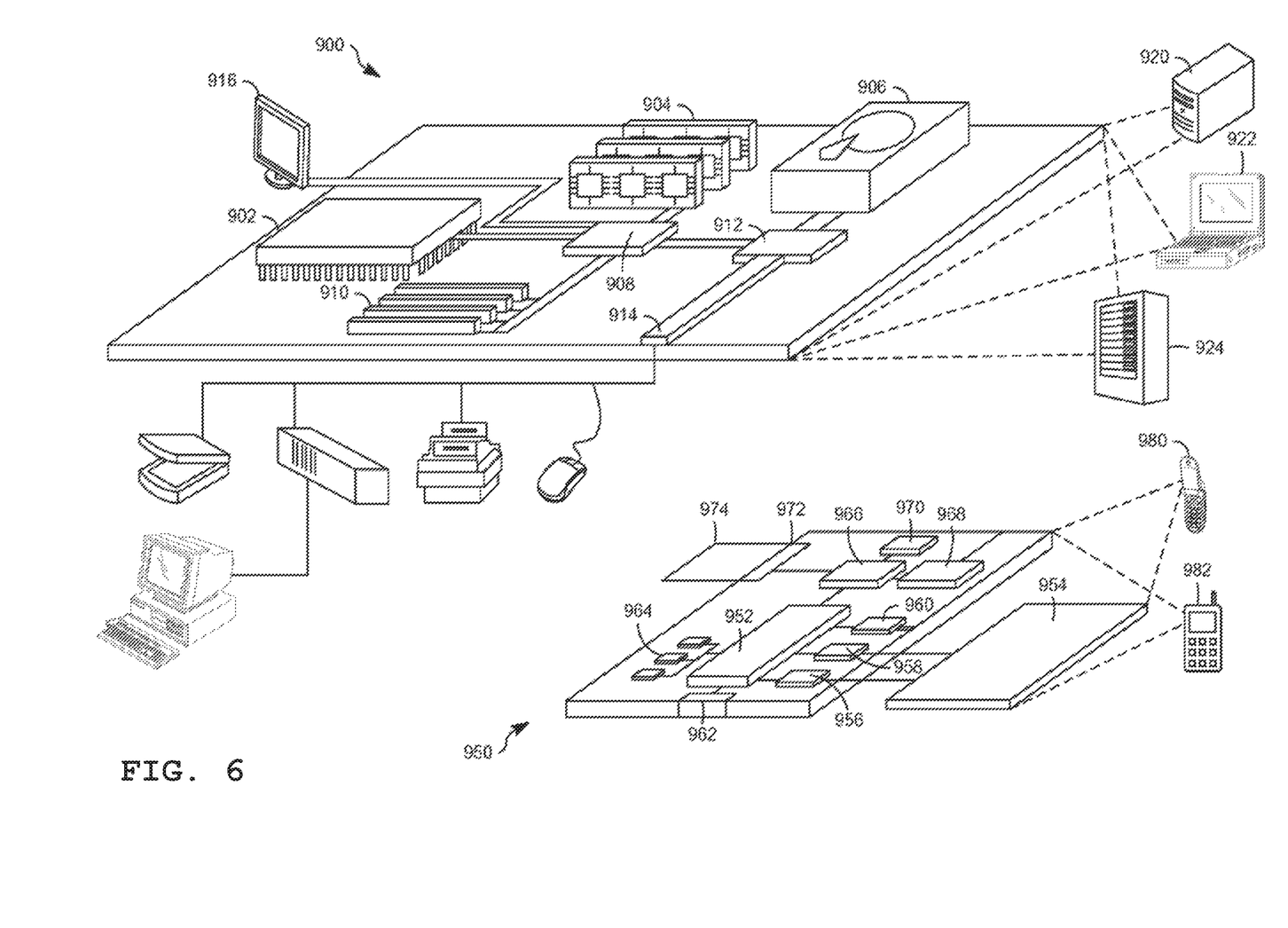
FIG. 6 illustrates an example of a computer device and a mobile computer device, which may be used with the techniques described herein.

FIG. 6 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device 900 may correspond to the computer system 100 of FIG. 1. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the approaches described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described herein. Nevertheless, it will be understood that various modifications may be made without departing from the spirit and scope of the present disclosure.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The invention claimed is:

1. A computer-implemented method for memory management in a computer system having a random-access memory (RAM) as physical memory, the computer system generating a logical address space including logical addresses that are not physical memory addresses in the RAM, the method comprising:

operating an automatic memory management (AMM) module coupled to the computer system to:

divide the logical address space into a compaction subspace and a noncompaction subspace, wherein compaction in the RAM of objects having logical addresses assigned from the compaction subspace is to be enabled and compaction in the RAM of objects having logical addresses assigned from the noncompaction space is to be disabled;

reserve portions of the logical addresses in the noncompaction subspace, the portions having slots for objects of different size classes, wherein the reserving includes calculating a size of each reserved portion in correspondence to a maximum heap size of a mutator, with the maximum heap size being an accumulated size of objects to be potentially stored in the RAM by the mutator;

receive, from the mutator, memory allocation requests for particular objects to be stored in the RAM;

distinguish the particular objects as being compactible objects or non-compactible objects according to at least one criterion;

allocate a particular logical addresses within the logical address space to each particular object from either the compaction subspace or from the noncompaction subspace according to whether the each particular object is a compactible object or a non-compactible object,     map, by the AMM module, the allocated logical addresses from the noncompaction subspace to physical memory in the RAM without moving or compacting corresponding objects stored in the RAM while avoiding compacting in the logical address space; and compact, by the AMM module, the logical addresses within the compaction subspace in combination with moving and compacting corresponding objects in the RAM.

2. The method of claim 1, wherein in the reserving, a factor corresponds to the number of the portions in the second subspace of the logical address space, and wherein each portion has slots for objects of a particular size.

3. The method of claim 1, wherein the reserving is performed for portions of equal size.

4. The method of claim 1, wherein the reserving includes calculating the size of the portions in correspondence to the maximum heap size.

5. The method of claim 1, wherein the reserving includes reserving portions with a start portion having a first number of slots as a power-of-2 number, and with adjacent slots having numbers of slots calculated in a geometric series from the first number of slots.

6. The method of claim 1, wherein in the allocating, the AMM module distinguishes the particular objects according to the at least one criterion being an object size criterion.

7. The method of claim 6, wherein in the allocating, the AMM module uses a predefined threshold size as the object size criterion, and allocates logical addresses in the first subspace for objects having an object size below the predefined threshold size and allocates logical addresses in the second subspace for objects having an object size above the predefined threshold size or equal to the predefined threshold size.

8. The method of claim 7, wherein the predefined threshold size is related to a page size of the random-access memory.

9. The method of claim 8, wherein the predefined threshold size is equal to the page size or to a multiple of the page size.

10. The method of claim 1 further comprising: de-allocating one or more of the particular logical addresses from either subspace; and instructing the memory management module to de-map the physical memory from the previously allocated logical addresses in the second subspace without compacting the objects in random-access memory.

11. The method of claim 1, wherein the AMM module distinguishes the particular objects according to the at least one criterion being an object attribute, and wherein the object attribute includes one or more attributes selected from the following: object type, frequency of object accesses, the object being passed to external code, and the object being accessed directly by hardware.

12. A system for storing objects in a random-access memory (RAM) of a computer system, the computer system having the RAM as physical memory, the computer system generating a logical address space including logical addresses that are not physical memory addresses in the RAM, the system comprising:
at least one processor; and
at least one memory storing instructions that are executable by the at least one processor to couple an automatic memory management (AMM) module to the system and operate the AMM) module to:
divide the logical address space into a compaction subspace and noncompaction subspace, wherein compaction in the RAM of objects having logical addresses assigned from the compaction subspace is to be enabled and compaction in the RAM of objects having logical addresses assigned from the noncompaction space is to be disabled;
reserve portions of the logical addresses in the noncompaction subspace, the portions having slots for objects of different size classes, wherein the reserving includes calculating a size of each reserved portion in correspondence to a maximum heap size of a mutator, with the maximum heap size being an accumulated size of objects to be potentially stored in the RAM by the mutator;
receive, from the mutator, memory allocation requests for particular objects to be stored in the RAM;
distinguish the particular objects as being compactible objects or non-compactible objects according to at least one criterion;
allocate a particular logical address within the logical address space to the each particular object either from the compaction subspace or from the noncompaction subspace according to whether the each particular object is a compactible object or a non-compactible object,
map, by the AMM module, the allocated logical addresses from the second noncompaction subspace to physical memory in the RAM without moving or compacting corresponding objects stored in the RAM while avoiding compacting in the logical address space; and
compact, by the AMM module, the logical addresses within the first compaction subspace in combination with moving and compacting corresponding objects in the RAM.

13. A computer program product, the computer program product being tangibly embodied on a non-transitory computer-readable storage medium and comprising instructions that, when executed, are configured to cause at least one computing device-to manage memory in a computer system having a random-access memory (RAM) as physical memory, the computer system generating a logical address space including logical addresses that are not physical memory addresses in the RAM, by:
coupling an automatic memory management (AMM) module to the computer system; and
operating the AMM module to:
divide the logical address space into a compaction subspace and noncompaction subspace, wherein compaction in the RAM of objects having logical addresses assigned from the compaction subspace is to be enabled and compaction in the RAM of objects having logical addresses assigned from the noncompaction space is to be disabled;
reserve portions of the logical addresses in the noncompaction subspace, the portions having slots for objects of different size classes, wherein the reserving includes calculating a size of each reserved portion in correspondence to a maximum heap size of a mutator, with the maximum heap size being an accumulated size of objects to be potentially stored in the RAM by the mutator;
receive, from the mutator, memory allocation requests for particular objects to be stored in the RAM;
distinguish the particular objects as being compactible objects or non-compactible objects according to at least one criterion;
allocate a particular logical address within the logical address space to the each particular object either from the compaction subspace or from the noncompaction subspace according to whether the each particular object is a compactible object or a non-compactible object;

map, by the AMM module, the allocated logical addresses from the second noncompaction subspace to physical memory in the RAM without moving or compacting corresponding objects stored in the RAM while avoiding compacting in the logical address space; and compact, by the AMM module, the logical addresses within the first compaction subspace in combination with moving and compacting corresponding objects in the RAM.

14. The computer program product of claim 13, wherein in the reserving, a factor corresponds to the number of the portions in the second subspace of the logical address space, and wherein each portion has slots for objects of a particular size.

15. The computer program product of claim 13, wherein the reserving is performed for portions of equal size.

16. The computer program product of claim 13, wherein the reserving includes calculating the size of the portions in correspondence to the maximum heap size.

17. The computer program product of claim 13, wherein the reserving includes reserving portions with a start portion having a first number of slots as a power-of-2 number, and with adjacent slots having numbers of slots calculated in a geometric series from the first number of slots.

18. The computer program product of claim 13, wherein in the allocating, the AMM module distinguishes the particular objects according to the at least one criterion being an object size criterion.

19. The computer program product of claim 18, wherein in the allocating, the AMM module uses a predefined threshold size as the object size criterion, and allocates logical addresses in the first subspace for objects having an object size below the predefined threshold size and allocates logical addresses in the second subspace for objects having an object size above the predefined threshold size or equal to the predefined threshold size.

20. The computer-program product of claim 13, wherein the AMM module is part of a run-time environment for the mutator written in a programming language selected from the group of: JAVA, C #, PYTHON, JAVASCRIPT, SCALA, and GO.

* * * * *